US012801440B2

(12) United States Patent
Girardi et al.

(10) Patent No.: US 12,801,440 B2
(45) Date of Patent: Nov. 17, 2026

(54) INPUT FILTERING STAGE FOR PROCESSING UNIT IN HARDWARE ACCELERATOR

(71) Applicant: STMicroelectronics International N.V., Geneva (CH)

(72) Inventors: Francesca Girardi, Cesano Maderno (IT); Thomas Boesch, Rovio (CH); Giuseppe Desoli, San Fermo Della Battaglia (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/905,894

(22) Filed: Oct. 3, 2024

(65) Prior Publication Data

US 2026/0147622 A1 May 28, 2026

(51) Int. Cl.
*G06F 9/50* (2006.01)
*G06F 9/54* (2006.01)

(52) U.S. Cl.
CPC ............ *G06F 9/5027* (2013.01); *G06F 9/542* (2013.01); *G06F 9/544* (2013.01); *G06F 2209/5011* (2013.01)

(58) Field of Classification Search
None
See application file for complete search history.

(56) References Cited

U.S. PATENT DOCUMENTS

2009/0198856 A1 * 8/2009 Habben .................. H04L 43/00 710/305
2012/0327951 A1 12/2012 Sgouros et al.
2018/0189215 A1 7/2018 Boesch et al.
2022/0092399 A1 * 3/2022 Boyd .................. G06N 3/0464
2022/0101086 A1 3/2022 Cappetta et al.
2023/0135185 A1 5/2023 Singh et al.
2023/0206051 A1 6/2023 Mills et al.
2023/0259578 A1 8/2023 Sanchez et al.

OTHER PUBLICATIONS

Cammert et al., “An Approach to Adaptive Memory Management in Data Stream Systems,” Proceedings of the 22nd International Conference on Data Engineering (ICDE’06), Atlanta, GA, Apr. 3-7, 2006, 3 pages.

* cited by examiner

*Primary Examiner* — Scott C Sun
(74) *Attorney, Agent, or Firm* — Seed IP Law Group LLP

(57) ABSTRACT

An input filtering stage for a processing unit in a hardware accelerator is disclosed. A hardware accelerator includes one or more processing units. Each of the one or more processing units includes a buffer and an input filtering stage. The input filtering stage is configured to receive an input data stream that includes a plurality of input channels. Data selection criteria that indicate one or more input channels of the plurality of input channels are obtained. The one or more input channels from the plurality of input channels are selected based on the data selection criteria and provided to the buffer.

10 Claims, 6 Drawing Sheets

INPUT FILTERING STAGE FOR PROCESSING UNIT IN HARDWARE ACCELERATOR

BACKGROUND

Technical Field

The present disclosure relates generally to hardware accelerators, and more particularly to input filtering stages for processing units in hardware accelerators.

BRIEF SUMMARY

An input filtering stage for a processing unit in a hardware accelerator is disclosed. A hardware accelerator includes one or more processing units. Each of the one or more processing units includes a buffer and an input filtering stage. The input filtering stage is configured to receive an input data stream that includes a plurality of input channels. Data selection criteria that indicate one or more input channels of the plurality of input channels are obtained. The one or more input channels from the plurality of input channels are selected based on the data selection criteria and provided to the buffer.

DETAILED DESCRIPTION

Figure 1:
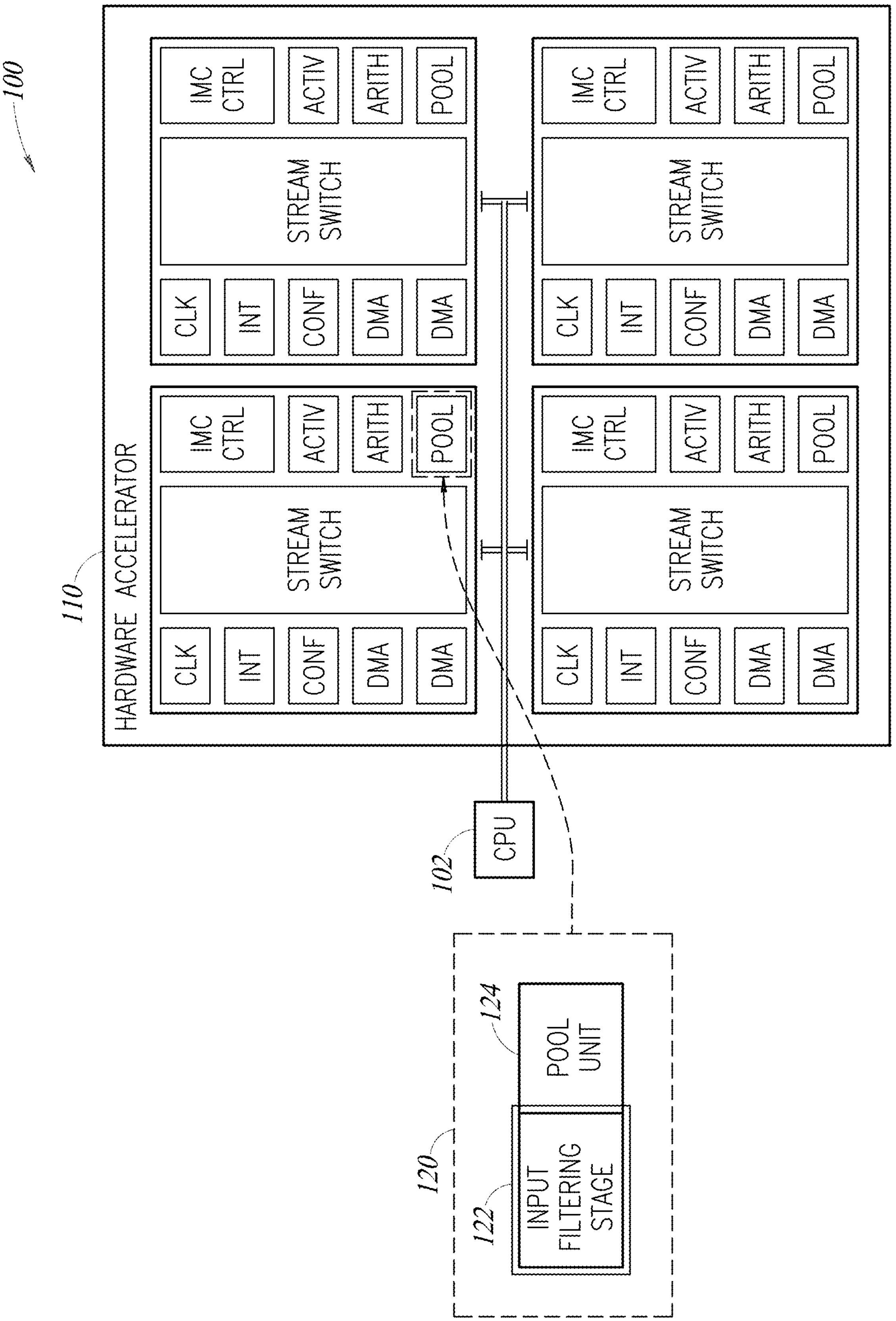
FIG. 1 is a diagram illustrating an input filtering stage of a processing unit of a hardware accelerator according to some embodiments.

Hardware acceleration can be used to improve performance of various software applications such as convolutional neural networks. Hardware accelerators typically contain multiple processing units that are dedicated to performing selected calculations. For example, in the case of convolutional neural networks or recurrent neural networks, one or more processing units may be dedicated to performing pooling or applying activation functions. Processing units typically operate on multi-dimensional tensors, such as sets of images.

For some operations such as pooling, a processing unit obtains and stores several values of the input to perform the operation. Often, these values are stored using a buffer of the processing unit. But due to space and cost restraints, capacities of processing unit buffers are limited. For example, an internal line buffer of the processing unit may be capable of storing a 3D tensor of maximum depth of 8 (e.g., a tensor with 8 input channels).

Certain operations such as pooling are performed on input having a depth greater than can be stored in a processing unit buffer. Thus, the input is typically divided into smaller batches that can be stored using the processing unit buffers. The smaller batches are then individually sent to processing units. To split the input into batches, the input is accessed several times in memory, and each batch is created by extracting data of the input that corresponds to the batch and discarding data of the input that does not correspond to the batch. Each batch, now having a dimensionality that can be stored in a processing unit buffer, is individually sent to processing units to be processed using a direct memory access (i.e., a "DMA"). This process is resource-intensive and slow, accessing memory several times and occupying multiple direct memory access (DMA) units to convey the different batches from memory to multiple units. As a result, performance of key operations of hardware accelerators is significantly degraded when input exceeds memory capacity of processing units.

In at least this context, techniques disclosed herein include adding an input filtering layer to a processing unit such as a pooling unit. The input filtering layer receives the input and provides only selected portions of the input to the corresponding processing unit. An input filtering layer and processing unit pair is sometimes referred to herein as a "filtered processing unit", or when the processing unit is a pooling unit, a "filtered pooling unit".

Efficiency gains enabled by the input filtering layer rely, in part, on the capability of a single DMA to simultaneously provide a same data stream to any number of processing units. Thus, in various embodiments, only one DMA is used to provide the same data stream to each filtered processing unit. This contrasts with less efficient techniques, wherein a separate DMA is used to provide a batch of the input to each corresponding processing unit.

According to embodiments described herein, a tensor having a depth greater than a maximum depth of a processing unit is not split into smaller batches and individually sent to processing units as in typical hardware accelerators. Rather, the same tensor—including input to multiple processing units—is broadcasted from the DMA unit to each filtered processing unit being used to process the input, despite the input having a depth greater than can be processed using a processing unit.

When the filtered processing unit receives the input, a filtering stage selects channels of the input that the filtered processing unit is assigned to process. When the input channel is assigned to be processed using the filtered processing unit, the input filtering stage passes the selected input channels to the processing unit. When an input channel is not assigned to be processed by the processing unit, the filtering stage ignores the input channel. In this way, each processing unit obtains only relevant input channels. This alleviates the need to process the input into different batches and individually provide the batches to the units as described above, improving efficiency of the hardware accelerator.

In some embodiments, an apparatus includes a hardware accelerator having one or more processing units. Each of the one or more processing unit includes a buffer and an input filtering stage. The input filtering stage is configured to receive an input data stream that includes a plurality of input channels. Data selection criteria that indicate one or more input channels of the plurality of input channels are obtained. The one or more input channels from the plurality of input channels are selected based on the data selection criteria and provided to the buffer.

In some embodiments, a system includes a direct memory access unit; a first filtering stage configured to provide first channels of an input data stream to a first processing unit; a second filtering stage configured to provide second channels of the input data stream to a second processing unit; and a stream switch configured to concurrently provide an input data stream from the direct memory access unit to the first filtering stage and the second filtering stage.

In some embodiments, a method includes multicasting an input data stream to a plurality of input filtering stages that correspond to a plurality of processing units of a hardware accelerator. Selected channels of the input data stream that are to be processed using respective processing units of the plurality of processing units are filtered using each input filtering stage. The selected channels are processed into a plurality of output subsequences using the plurality of processing units. The plurality of output subsequences are combined into an output sequence.

While the input filtering stage is described herein in terms of filtering input to a pool unit of a hardware accelerator for ease of discussion, the disclosure is not so limited. In various embodiments, the input filtering stage is used to filter input to a processing unit that implements any function. In various non-limiting examples, the function implemented by the processing unit includes: an activation function; an arithmetic function; one or more operations of a transformer model such as a self-attention function, a multi-head attention function, a tokenizer, an embedding layer, an unembedding layer, a transformer layer, etc.; a long short-term memory cell; a gated recurrent unit; any other function associated with any artificial intelligence model; a matrix operation such as matrix multiplication, transposition, etc.; a signal decomposition operation such as fast Fourier transform, wavelet decomposition, etc.; a hash function; or any combination thereof.

FIG. 1 is a diagram 100 that illustrates an input filtering stage of a processing unit of a hardware accelerator according to some embodiments. Hardware accelerator includes central processing unit (i.e., "CPU") 102, which is configured to facilitate data transfer between hardware accelerator 110 and other components of a computing system. Hardware accelerator 110 includes filtered processing unit 120. Filtered processing unit 120 includes input filtering stage 122 and processing unit 124. Filtered processing unit 120 is configured to process selected channels of a data input stream. Input filtering stage 122 is configured to provide selected channels of a data input stream to processing unit 124. As shown in FIG. 1, processing unit 124 is a pool unit configured to perform pooling operations, such as for a convolutional neural network. Because input filtering stage 122 is usable to process selected channels of an input data stream, in various embodiments it is employed with processing units that operate on input having a potentially large number of input channels. For example, pool units apply a filter over each channel of a feature map to summarize the feature map. Thus, the pool unit stores in its buffer a tensor of input values to which to apply the filter depending on the size of the filter and characteristics of the input. While in various embodiments an input filtering layer is added to processing units that operate on input having a depth greater than a maximum depth of the processing unit, the disclosure is not so limited. In various embodiments, an input filtering layer is added to any processing unit.

In some embodiments, some processing units of hardware accelerator 110 include input filtering stage 122, and some processing units of hardware accelerator 110 do not include input filtering stage 122. In one non-limiting example, one or more pool units of hardware accelerator 110 include a filtering stage, and one or more arithmetic units of hardware accelerator 110 do not include a filtering stage.

While filtered processing unit 120 as depicted in FIG. 1 includes one input filtering stage and one processing unit, the disclosure is not so limited. In various embodiments, an input filtering stage is shared between a plurality of processing units of any type. In one non-limiting example, a same input filtering stage is used to filter data to a pool unit and to an arithmetic unit.

Figure 2:
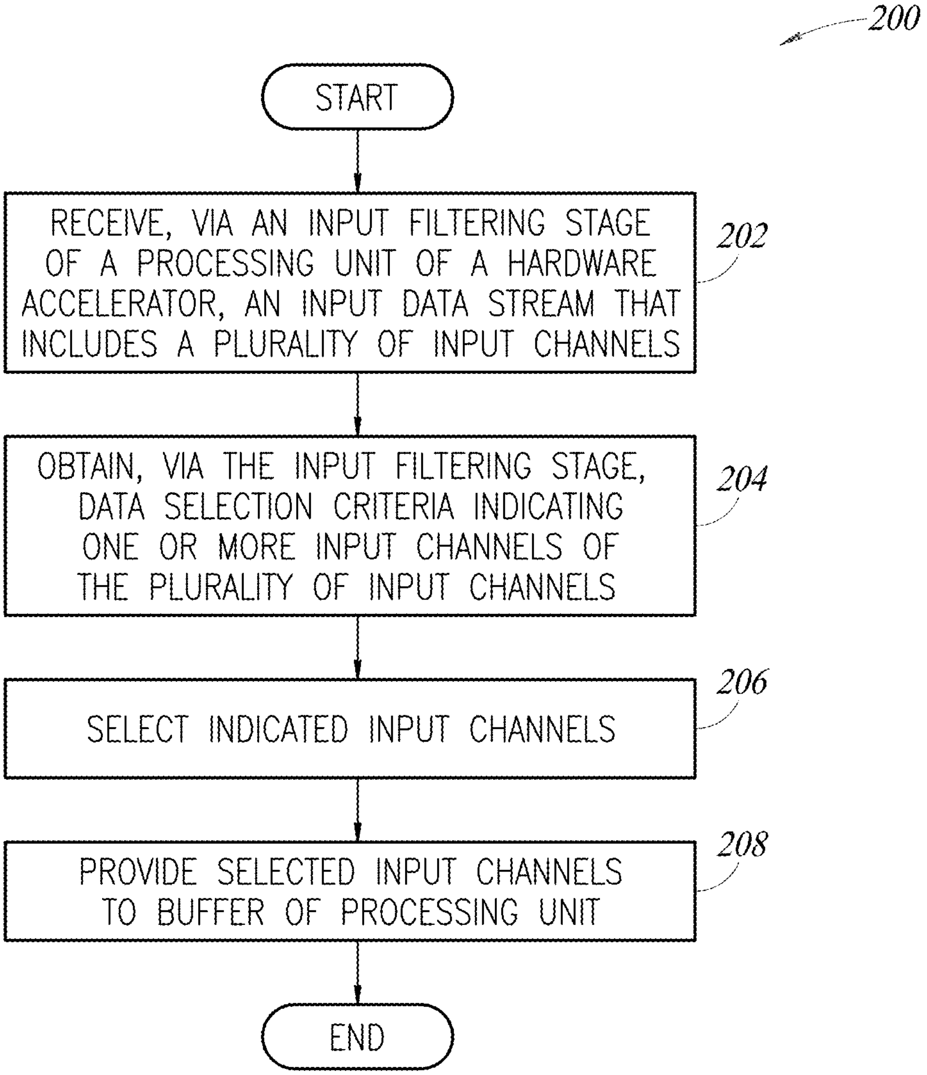
FIG. 2 is a logical flow diagram illustrating a process used to filter input to a processing unit of a hardware accelerator according to some embodiments.

FIG. 2 is a logical flow diagram illustrating a process 200 used to filter input to a processing unit of a hardware accelerator according to some embodiments. In various embodiments, process 200 is implemented using hardware accelerator 110 of FIG. 1.

Process 200 begins, after a start block, at block 202, where an input data stream that includes a plurality of input channels is received via an input filtering stage of a processing unit of a hardware accelerator. In some embodiments wherein the hardware accelerator is configured to perform operations of a neural network such as a convolutional neural network (i.e., a "CNN") or a recurrent neural network (i.e., an "RNN"), such as pooling operations.

In some embodiments, the input data stream has a number of channels that exceeds a maximum depth of a buffer of one or more of the processing units. In one non-limiting example, In various embodiments, the input data stream has any dimensionality. After block 202, process 200 continues to block 204.

At block 204, data selection criteria indicating one or more input channels of the plurality of input channels is obtained via the input filtering stage. In some embodiments, the data selection criteria includes a count of the plurality of input channels, a start channel, and an end channel.

While the data selection criteria is described above in terms of a start channel and an end channel, embodiments are not so limited. In various embodiments, the data selection criteria define any number of start values and end values to define selected data in any number of dimensions. In various embodiments, the data selection criteria are usable to perform various filtering techniques such as filtering by tags associated with portions of the input, two-dimensional filtering, filtering through virtual channels, etc. After block 204, process 200 continues to block 206.

Figure 4:
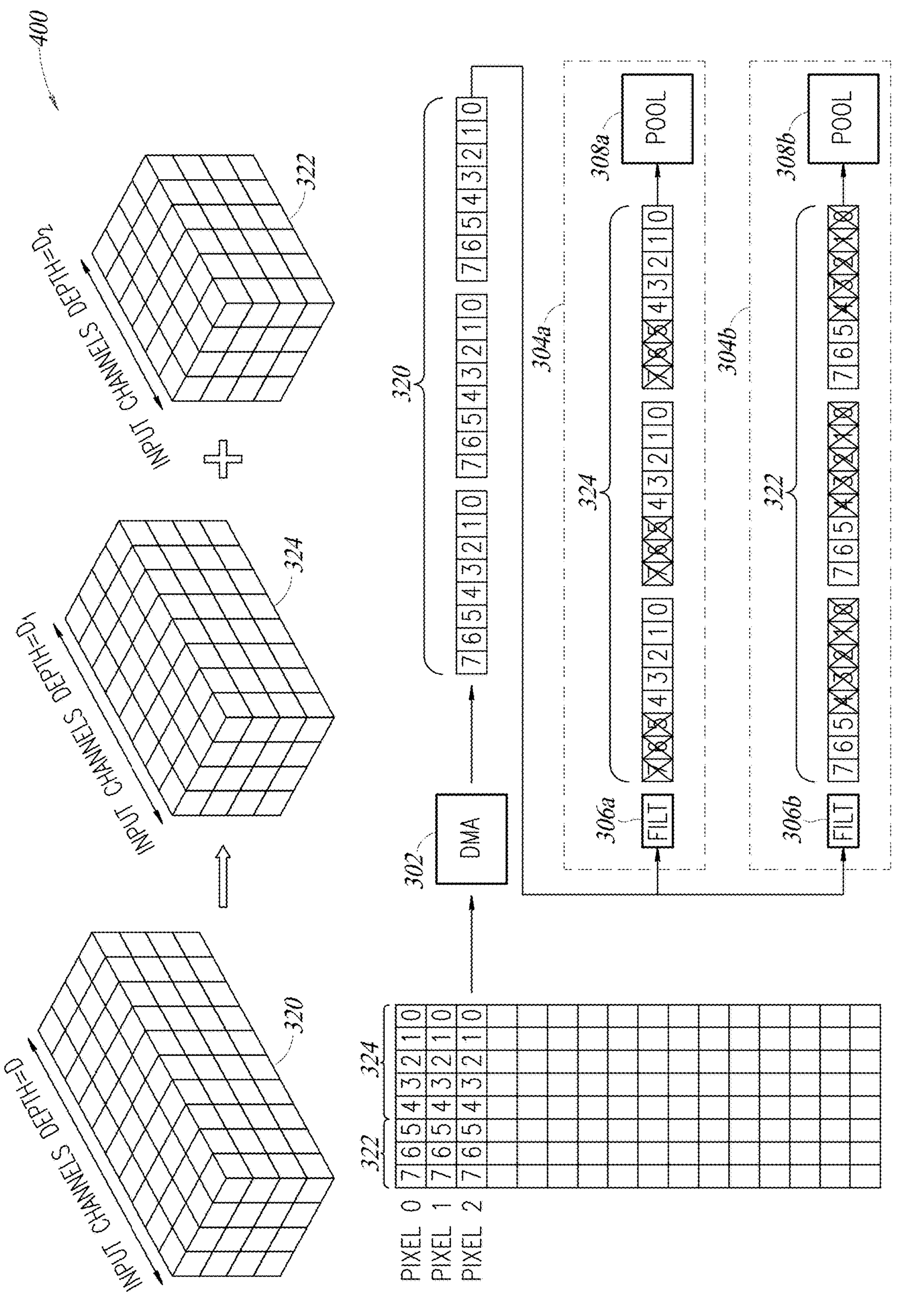
FIG. 4 is a diagram illustrating data flow of input filtering stages of processing units of a hardware accelerator according to some embodiments.

At block 206, the indicated input channels or portions thereof are selected. In some embodiments each input channel within an indicated start channel and end channel are selected. Referring to FIG. 4 by way of example, input 320 includes eight input channels. First input channels 324 includes five input channels of input 320, and second input channels 322 includes three input channels of input 320. DMA 302 provides input 320 including the eight input channels to input filtering stages 306*a* and 306*b*. Input 320 is processed into a data stream by linearly reading from memory each of the 8 input channels associated with a pixel from memory, and then continuing to the next pixel, and so on. Thus, each eighth element in the data stream corresponds to a same input channel. Continuing the above example, each "0" in input 320 corresponds to a first input channel, each "1" corresponds to a second input channel, each "2" corresponds to a third input channel, etc. Thus, to select input channel 7, each eighth element of the input data stream is selected, starting from the first "7" in the input data stream (i.e., the eighth element of the input data stream).

In some embodiments, the input channels are selected using modular arithmetic. A counter corresponding to a current input channel of the data stream is maintained. The counter is reset after reading a number of elements corresponding to the number of channels in input 320. In some embodiments, a range of channels is defined using a start channel and an end channel. In one non-limiting example shown in FIG. 4, first input channels 324 includes the first five channels of input 320. Thus, the first start channel is 0 and the first end channel is 4. Similarly in FIG. 4, second input channels 322 includes the last three input channels of input 320. Thus, the second start channel is 5 and the second end channel is 7. To select first input channels 324, input filtering stage 306*a* selects a first range of channels defined by the first start channel and the first end channel. To select second input channels 322, input filtering stage 306*b* selects a second range of channels defined by the second start channel and the second end channel.

In some embodiments, a count of the indicated input channels is no greater than a maximum depth of a buffer of the processing unit. In one non-limiting example, when the buffer has a maximum depth of 8, the count of the indicated input channels is no greater than 8. After block 206, process 200 continues to block 208.

At block 208, the selected input channels are provided to a buffer of the processing unit. In some embodiments, the buffer is a line buffer. After block 208, process 200 ends at an end block.

While process 200 is described in terms of one input filtering stage, the disclosure is not so limited. In various embodiments, any number of input filtering stages are used to select corresponding input channels to provide to processing unit.

Moreover, while process 200 is described in terms of one-dimensional filtering of input channels for ease of discussion, embodiments similar to process 200 are usable to perform various filtering techniques such as filtering by tags associated with portions of the input, two-dimensional filtering, filtering through virtual channels, etc.

Figure 3:
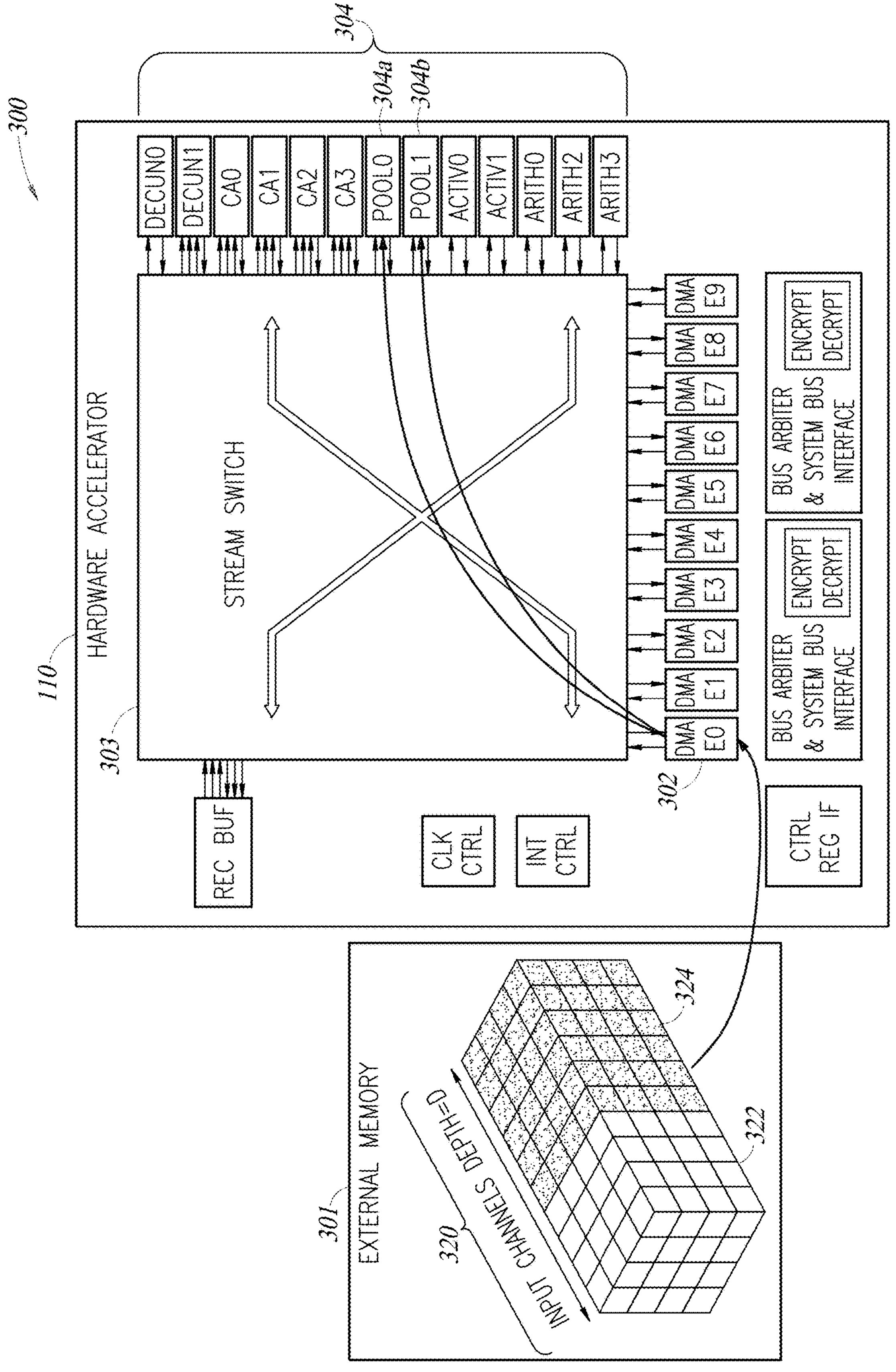
FIG. 3 is a diagram illustrating data flow in a system used to filter input to a processing unit of a hardware accelerator according to some embodiments.

FIG. 3 is a diagram illustrating data flow in a system 300 used to filter input to a processing unit of a hardware accelerator according to some embodiments.

System 300 includes hardware accelerator 110 and external memory 301. Hardware accelerator 110 includes direct memory access 302, which is configured to facilitate data transfer between external memory 301 and stream switch 303.

In some embodiments, external memory stores input 320. Examples of external memory 301 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. In some embodiments, external memory 301 is used to store information, including computer-readable instructions that are utilized by processor 102 of FIG. 1 to perform actions, including at least some embodiments described herein.

Input 320 is a tensor to be processed using hardware accelerator 110. In one non-limiting example, input 320 is a 3-dimensional tensor having a width, height, and depth. In various embodiments, input 320 is a tensor having any number of dimensions.

Stream switch 303 is configured to facilitate data transfer between various units of hardware accelerator 110, such as between one or more processing units in processing units 304 and direct memory access 302. In some embodiments, stream switch 303 is configured to multicast a data stream from a first unit to a plurality of second units. A time during which stream switch 303 is configured to facilitate information transfer between selected units of hardware accelerator 110 is referred to as an "epoch". In one non-limiting example shown in FIG. 3, stream switch 303 is configured in a first epoch to provide input 320 to filtered pool unit 304*a* and filtered pool unit 304*b*. In various embodiments, stream switch 303 is configured to provide information from any number of units of hardware accelerator 110 to any number of units of hardware accelerator 110.

Filtered pool unit 304*a* and filtered pool unit 304*b* are configured to select channels of input 320 they are assigned to process and perform pooling operations on the selected channels. In various embodiments, filtered pool unit 304*a* and filtered pool unit 304*b* may be the same or different. In one non-limiting example, filtered pool unit 304*a* and filtered pool unit 304*b* have different maximum depths or other characteristics. In some embodiments, filtered pool unit 304*a* and filtered pool unit 304*b* are assigned different numbers of channels in input 320 to process. In one non-limiting example, when input 320 includes ten input channels, pool unit 304*a* is assigned to process eight of the input channels and filtered pool unit 304*b* is assigned to process two of the input channels. In some embodiments, the number of input channels assigned to be processed by a processing units corresponds to a maximum depth of a buffer of the processing unit. In the example shown in FIG. 3, filtered pool unit 304*a* is configured to select and process first input channels 324 of input 320, and filtered pool unit 304*b* is configured to select and process second input channels 322 of input 320.

FIG. 4 is a diagram illustrating data flow 400 of input filtering stages of processing units of a hardware accelerator according to some embodiments. Input 320 includes first input channels 324 and second input channels 322. While first input channels 324 and second input channels 322 are to be processed by separate pool units, input 320 is typically stored together in memory. When direct memory access 302 reads input 320 from memory, it reads input 320 linearly into a data stream. Input 320 is provided to filtered pool unit 304*a* and filtered pool unit 304*b* as a data stream. In the example shown in FIG. 4, input 320 includes a greater number of input channels than can be processed at once using either pool unit 308*a* or pool unit 308*b*. Accordingly, input filtering stage 306*a* provides first input channels 324 to pool unit 308*a*, and input filtering stage 306*b* provides second input channels 322 to pool unit 308*b*.

Figure 5:
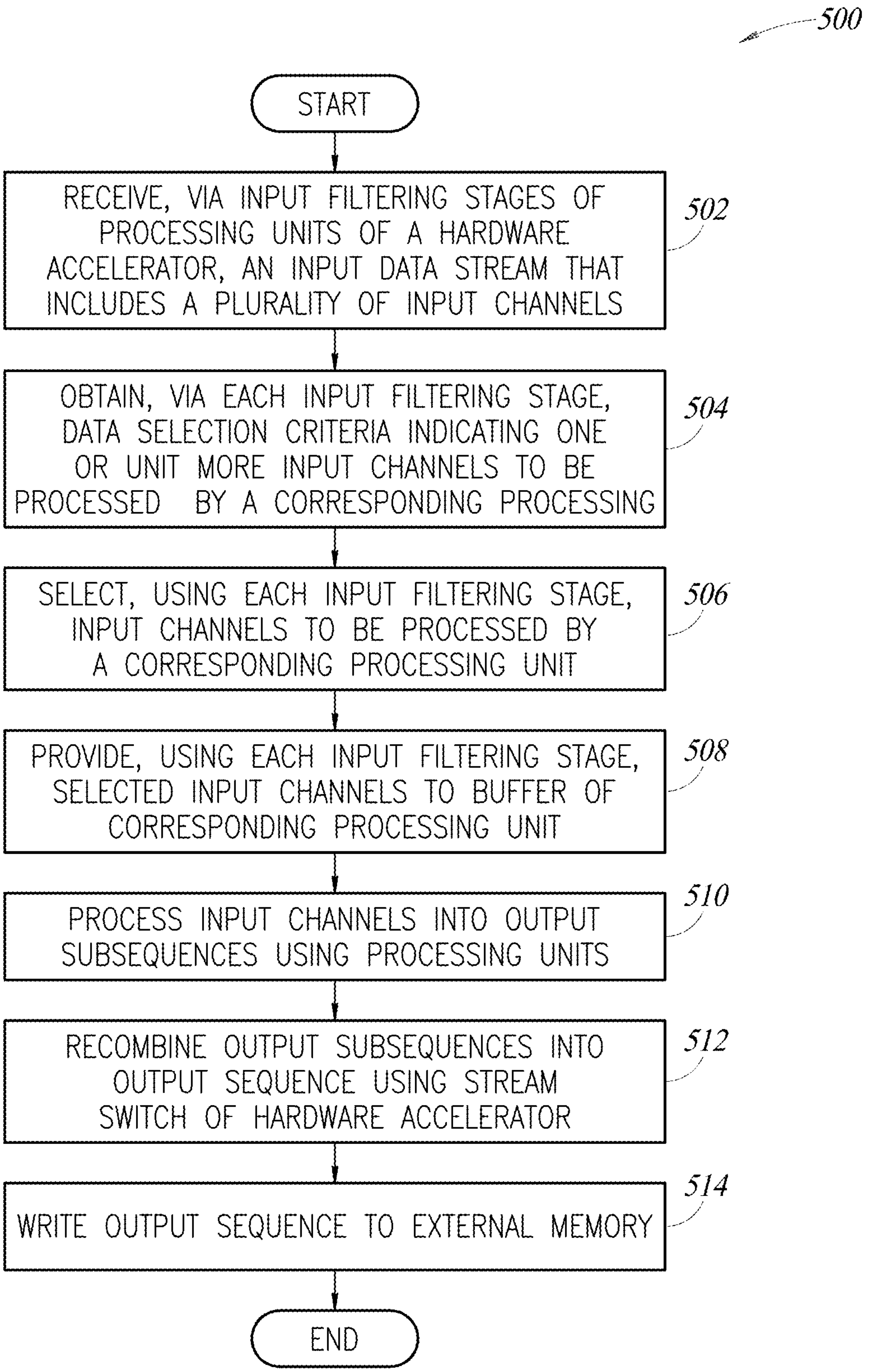
FIG. 5 is a logical flow diagram illustrating a process used to process an input data stream according to some embodiments.

FIG. 5 is a logical flow diagram illustrating a process 500 used to process an input data stream according to some embodiments. In various embodiments, process 500 is implemented using hardware accelerator 110 of FIG. 1.

Process 500 begins, after a start block, at block 502, where an input data stream that includes a plurality of input channels is received via input filtering stages of processing units of a hardware accelerator. In some embodiments, the plurality of input channels exceeds a maximum depth of one or more of the processing units. In various embodiments, the input data stream is provided to any number of input filtering stages. In various embodiments, block 502 employs embodiments of block 202 of FIG. 2 to receive the input data stream. After block 502, process 500 proceeds to block 504.

At block 504, data selection criteria indicating one or more input channels to be processed by a corresponding processing unit are obtained via each input filtering stage. In various embodiments, block 504 employs embodiments of block 204 of FIG. 2 to obtain the data selection criteria. After block 504, process 500 continues to block 506.

At block 506, input channels to be processed by corresponding processing units are selected using each input filtering stage. In various embodiments, block 506 employs embodiments of block 206 of FIG. 2 to select the input channels. After block 506, process 500 continue to block 508.

At block 508, the selected input channels are provided to buffers of corresponding processing units using each input filtering stage. In various embodiments, block 508 employs embodiments of block 208 of FIG. 2 to provide the selected input channels to buffers of corresponding processing units. After block 508, process 500 continues to block 510.

At block 510, the input channels are processed into output subsequences using the processing units. After block 510, process 500 continues to block 512.

At block 512, the output subsequences are combined into an output sequence using a stream switch of the hardware accelerator. In some embodiments, the output subsequences are combined into the output sequence by interleaving the output subsequences into the output sequence using the stream switch. Combining the output subsequences into an output sequence is discussed in further details with respect to FIG. 6. After block 512, process 500 continues to block 514.

At block 514, the output sequence is written to external memory. While block 514 as shown in FIG. 5 involves writing the output sequence to external memory, the disclosure is not so limited. In some embodiments, the output sequence is provided to one or more processing units of the hardware accelerator, such as via stream switch 303 of FIG. 3. In some embodiments, the output sequence is provided to another hardware accelerator or other computing resource, such as CPU 102 of FIG. 1. After block 514, process 500 ends at an end block.

Figure 6:
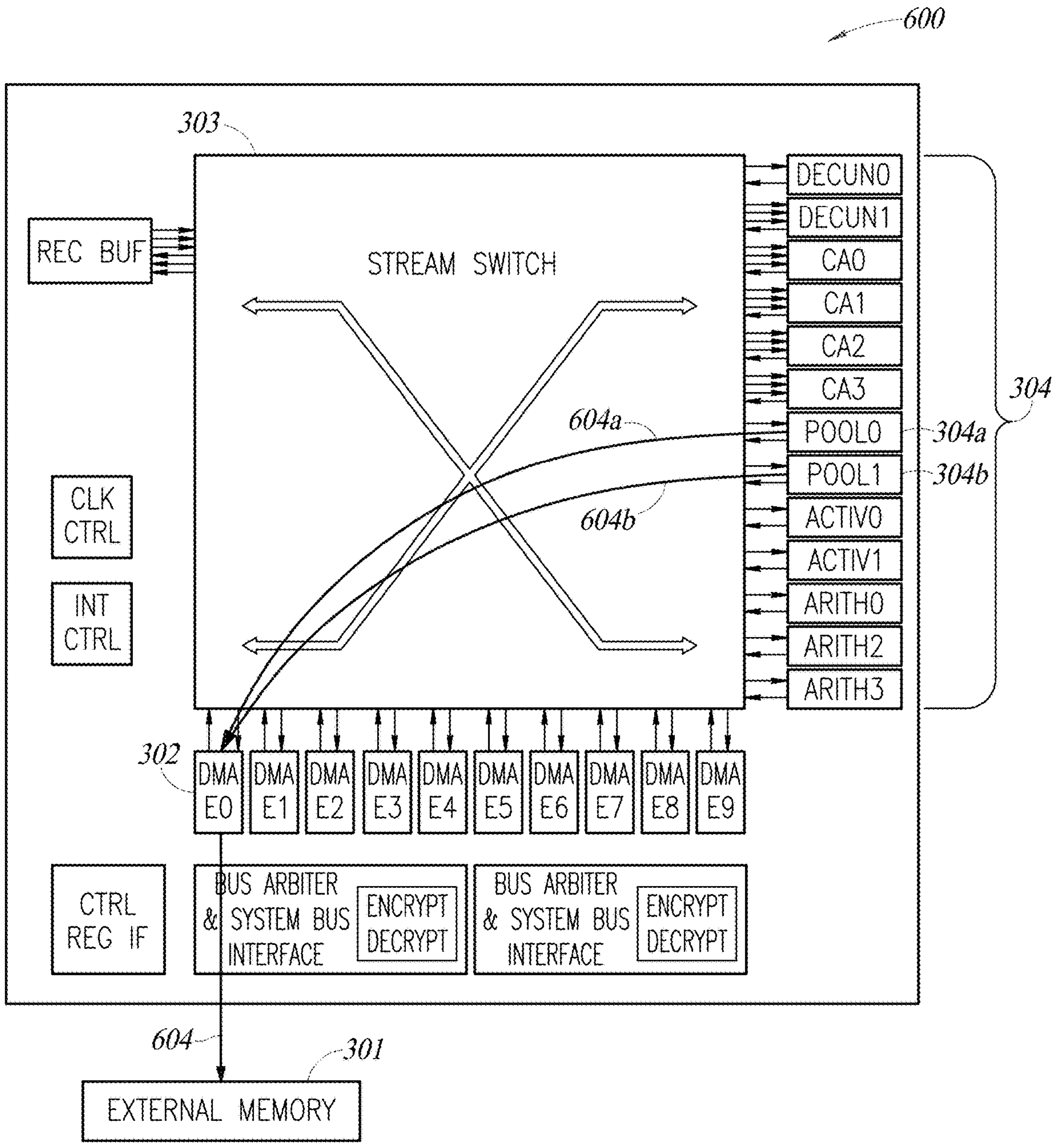
FIG. 6 is a diagram illustrating data flow in a system used to recombine outputs of processing units into an output according to some embodiments.

FIG. 6 is a diagram illustrating data flow in a system 600 used to recombine outputs of processing units into an output according to some embodiments. System 600 includes external memory 301, direct memory access 302, stream switch 303, and processing units 304. In various embodiments, these components operate as discussed with respect to FIG. 3.

The example shown in FIG. 6 continues the example shown in FIG. 3. In FIG. 6, input 320 shown in FIG. 3 has been provided to filtered pool unit **304*a* and filtered pool unit 304*b*. Filtered pool unit 304*a* has selected first input channels 324 of input 320 shown in FIG. 3 and has processed them into a first output subsequence 604*a*. Similarly, filtered pool unit 304*b* has selected second input channels 322 of input 320 shown in FIG. 3 and processed the second input channels 322 into second output subsequence 604*b***.

In some embodiments, the output subsequences are recombined into a format that corresponds to input 320 of FIG. 3. In some embodiments, the output subsequences are recombined using stream switch 303. In some such embodiments, stream switch 303 is configured to alternatively select a configurable number of elements from the first output subsequence **604*a* and a configurable number of elements from the second output subsequence 604*b*. In this way, stream switch 303 recombines first output subsequence 604*a* and second output subsequence 604*b* into output 604. Because output 604 as illustrated in FIG. 6 is a single data stream produced in stream switch 303, it is written to external memory 301 using only one direct memory access, such as direct memory access 302**.

In some embodiments, first output subsequence **604*a* and second output subsequence 604*b* are not recombined into output 604 using stream switch 303 and are written to external memory 301 or provided to another processing resource such as CPU 102 of FIG. 1** using two or more direct memory accesses.

In various embodiments, output 604 is any combination of first output subsequence **604*a* and 604*b*. In various embodiments, output 604** is any combination of any number of output subsequences.

As discussed herein, the disclosure is not limited to writing output sequence 604 to external memory 301. In some embodiments, output sequence 604 is provided to another processing unit in processing units 304 or other unit of the hardware accelerator. In some embodiments, output sequence 604 is provided to another computing device, such as via CPU 102.

The following is a summary of the claims as originally filed.

An apparatus of the present disclosure includes: a hardware accelerator having one or more processing units each including: a buffer; and an input filtering stage configured to: receive an input data stream that includes a plurality of input channels; obtain data selection criteria that indicate one or more input channels of the plurality of input channels; select the one or more input channels from the plurality of input channels based on the data selection criteria; and provide, to the buffer, the one or more input channels.

In some embodiments a count of the plurality of input channels exceeds a maximum depth of the buffer.

In some embodiments, the one or more processing units are a plurality of processing units.

In some embodiments, the apparatus includes a stream switch configured to provide, during a first epoch, the input data stream to respective input filtering stages of at least two different processing units of the one or more processing units.

In some embodiments, the hardware accelerator includes: a direct memory access unit; and a stream switch configured to: during a first epoch: provide the input data stream to a first input filtering stage of a first processing unit and a second input filtering stage of a second processing unit; and during a second epoch: receive a first output subsequence from the first processing unit and a second output subsequence from the second processing unit; combine the first output subsequence and the second output subsequence into an output sequence; and provide the output sequence to the direct memory access unit to be written to a memory.

In some embodiments, the data selection criteria specify a start channel, an end channel, and a count of the plurality of input channels, and the input filtering stage selects the one or more input channels by being further configured to: maintain a modular count of elements of the input data stream as the input data stream is received, wherein the count of the plurality of input channels is a modulus of the modular count; and select, as elements of the one or more input channels, each element of the input data stream for which the modular count is between the start channel and the end channel.

In some embodiments, the buffer is a line buffer.

In some embodiments, the hardware accelerator is a neural network hardware accelerator.

In some embodiments, the processing unit is a pooling unit.

In some embodiments, the input data stream is a three-dimensional tensor.

A system of the present disclosure includes: a direct memory access unit; a first filtering stage configured to provide first channels of an input data stream to a first processing unit; a second filtering stage configured to provide second channels of the input data stream to a second processing unit; and a stream switch configured to concurrently provide an input data stream from the direct memory access unit to the first filtering stage and the second filtering stage.

In some embodiments, the input data stream includes a number of channels that exceeds a maximum depth of the first processing unit.

In some embodiments, the stream switch is configured to: receive a first output subsequence from the first processing unit; receive a second output subsequence from the second processing unit; combine the first output subsequence and the second output subsequence into an output sequence; and provide the output sequence to the direct memory access unit.

In some embodiments, the first filtering stage provides the first channels of the input data stream to the first processing unit by being further configured to: maintain a first modular count of elements of the input data stream, wherein a count of the plurality of input channels is a modulus of the first modular count; and select, as elements of the first channels to be processed using the first processing unit, each element of the input data stream for which the modular count is between a first start channel and a first end channel; and the second filtering stage provides the second channels of the input data stream to the second processing unit by being further configured to: maintain a second modular count of elements of the input data stream, wherein the count of the plurality of input channels is a modulus of the second modular count; and select, as elements of the second channels to be processed using the second processing unit, each element of the input data stream for which the second modular count is between a second start channel and a second end channel that define the second channels to be processed by the second processing unit.

In some embodiments, the first channels and the second channels do not include any common channels.

In some embodiments, the first processing unit and the second processing unit are pooling units.

A method of the present disclosure includes: multicasting an input data stream to a plurality of input filtering stages that correspond to a plurality of processing units of a hardware accelerator; filtering, using each input filtering stage, selected channels of the input data stream that are to be processed using respective processing units of the plurality of processing units; processing the selected channels into a plurality of output subsequences using the plurality of processing units; and combining the plurality of output subsequences into an output sequence.

In some embodiments, multicasting the input data stream includes: multicasting an input data stream to a plurality of input filtering stages that correspond to a plurality of processing units of a hardware accelerator, wherein a count of channels in the input data stream exceeds a maximum depth of a processing unit in the plurality of processing units.

In some embodiments, multicasting the input data stream includes: multicasting an input data stream to a plurality of input filtering stages that correspond to a plurality of processing units of a hardware accelerator, wherein a processing unit in the plurality of processing units is a pooling unit.

In some embodiments, multicasting the input data stream comprises: multicasting a three-dimensional tensor to a plurality of input filtering stages that correspond to a plurality of processing units of a hardware accelerator.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:

a hardware accelerator having one or more processing units, each processing unit of the one or more processing units including:

a buffer; and an input filtering stage configured to:

receive an input data stream that includes a plurality of input channels;

obtain data selection criteria that indicate one or more input channels of the plurality of input channels;

select the one or more input channels from the plurality of input channels based on the data selection criteria; and provide the one or more input channels to the buffer, prior to computation over data of the one or more input channels by the processing unit.

2. The apparatus of claim 1, wherein a count of the plurality of input channels exceeds a maximum depth of the buffer.

3. The apparatus of claim 1, wherein the one or more processing units are a plurality of processing units.

4. The apparatus of claim 1, further comprising a stream switch configured to provide, during a first epoch, the input data stream to respective input filtering stages of at least two different processing units of the one or more processing units.

5. The apparatus of claim 1, wherein the hardware accelerator includes:

a direct memory access unit; and a stream switch configured to:

during a first epoch:

provide the input data stream to a first input filtering stage of a first processing unit and a second input filtering stage of a second processing unit; and during a second epoch:

receive a first output subsequence from the first processing unit and a second output subsequence from the second processing unit;

combine the first output subsequence and the second output subsequence into an output sequence; and provide the output sequence to the direct memory access unit to be written to a memory.

6. The apparatus of claim 1, wherein the data selection criteria specify a start channel, an end channel, and a count of the plurality of input channels, and wherein the input filtering stage selects the one or more input channels by being further configured to:

maintain a modular count of elements of the input data stream as the input data stream is received, wherein the count of the plurality of input channels is a modulus of the modular count; and select, as elements of the one or more input channels, each element of the input data stream for which the modular count is between the start channel and the end channel.

7. The apparatus of claim 1, wherein the buffer is a line buffer.

8. The apparatus of claim 1, wherein the hardware accelerator is a neural network hardware accelerator.

9. The apparatus of claim 1, wherein the processing unit is a pooling unit.

10. The apparatus of claim 1, wherein the input data stream is a three-dimensional tensor.

* * * * *